United States Patent [19]

Krabacher

[11] 3,861,140

[45] Jan. 21, 1975

[54] TURBOFAN ENGINE MIXER

[75] Inventor: Roy A. Krabacher, Cincinnati, Ohio

[73] Assignee: General Electric Company, Cincinnati, Ohio

[22] Filed: July 27, 1973

[21] Appl. No.: 383,169

Related U.S. Application Data

[62] Division of Ser. No. 269,017, July 5, 1972, Pat. No. 3,793,865.

[52] U.S. Cl.............. 60/262, 72/197, 72/379, 181/33 GA, 181/33 HB, 181/33 HC, 239/265.17

[51] Int. Cl....... F02k 1/26, F02k 3/06, B21d 47/00

[58] Field of Search........ 60/262, 261, 271; 29/455; 181/33 HC, 33 GA, 33 HB; 239/265.13, 265.17; 72/197, 379

[56] References Cited
UNITED STATES PATENTS

| | | | |
|---|---|---|---|
| 3,514,955 | 6/1970 | Paulson et al. | 60/262 |
| 3,647,021 | 3/1972 | Millman et al. | 181/33 HC |
| 3,696,617 | 10/1972 | Ellis | 60/262 X |
| 3,712,062 | 1/1973 | Nash | 60/261 |
| 3,730,292 | 5/1973 | MacDonald | 181/33 HC |
| 3,737,005 | 6/1973 | Tontini | 181/33 HC |

*Primary Examiner*—Carlton R. Croyle
*Assistant Examiner*—Robert E. Garrett
*Attorney, Agent, or Firm*—Derek P. Lawrence; Lee H. Sachs

[57] ABSTRACT

A turbofan mixer is fabricated from a structural panel of the variety including substantially planar first and second walls and a filler material sandwiched therebetween. The mixer includes at least one acute angle formed by bending the structural panel about a portion of the first wall, whereby the first wall forms the interior and the second wall forms the exterior of the angle. The first and second walls are protected from crushing and stretching proximate the apex of the angle during the bending process by the prior or contemporaneous deformation of the aforementioned portion of the first wall into a form having a plurality of repetitive waves in the cross section thereof, whereby the first wall is reduced in length relative to the smooth outer wall. The first wall may be deformed by contact with a toothed roller or a reciprocable die or by other appropriate means.

3 Claims, 9 Drawing Figures

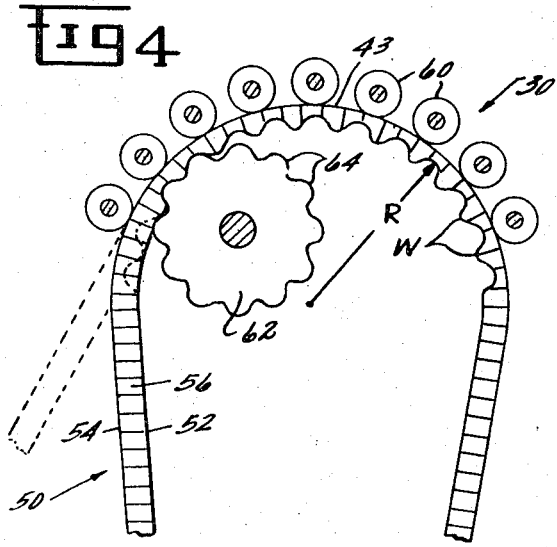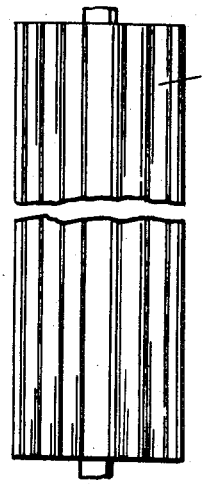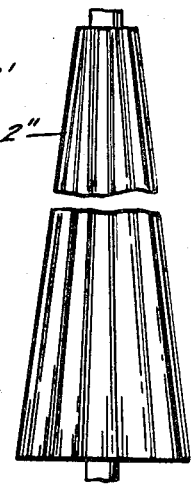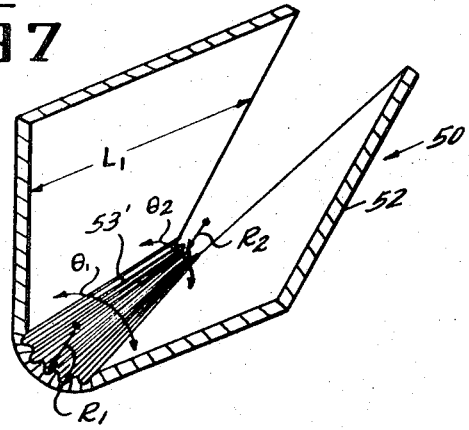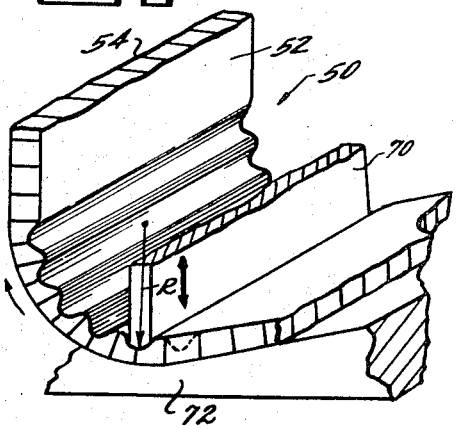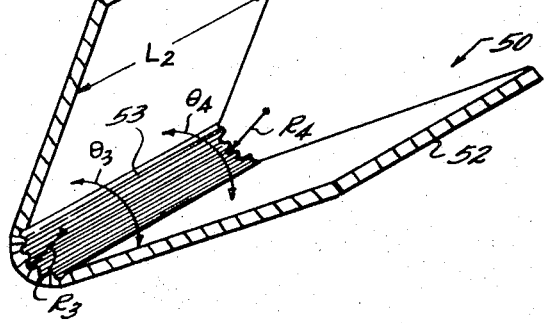

TURBOFAN ENGINE MIXER

This is a divisional application of application Ser. No. 269,017 filed July 5, 1972, now U.S. Pat. No. 3,793,865, and assigned to the same assignee as the present invention.

BACKGROUND OF THE INVENTION

This invention relates to improvements in the art of deforming structural materials, and more particularly to improved methods of bending structural panels of the sandwich type for use in turbofan engine mixers, as well as for other similar applications.

The invention herein described was made in the course of or under a contract, or a subcontract thereunder, with the United States Department of the Air Force.

In order to increase the effective thrust of the common turbojet engine, bladed fans have been added to a turbine driven shaft thereof to effect the flow of a quantity of atmospheric air through an annular passage defined between the turbojet and a radially spaced casing added thereto. The turbofan engine, as this combination has come to be known, has been found to be more efficient if the hot gas stream from the core engine (the basic turbojet portion of the turbofan) and the fan stream (the air stream forced through the annular passage by the fan) are mixed together before expulsion through a single nozzle.

In order to perform the mixing function, mixers have been devised which include chutes formed in the shape of lobes of structural material. The lobes, disposed downstream of the rear or exhaust of the core engine, extend radially outward from the central circular area of the hot gas stream and into the annular passage defining the fan stream. The mixer entrance is arranged so that adjacent chutes carry hot gas and fan streams respectively. Consequently, the radially separate streams entering the mixer are redirected thereby such that at the exit of the mixer the streams have been subdivided into a plurality of adjacent sectors. From this condition, the streams are mixed downstream of the mixer and exit from the engine via a single nozzle.

In order to maintain the strength of the mixer while minimizing its weight, it has become common practice to form the mixer from a single sheet of structural material. Concurrent noise abatement concern has led to the use, in the fabricating of mixers, of sandwich-type structural panel of the variety including first and second substantially planar walls and a sound absorbent filler material therebetween. The filler material may be of the common honeycomb variety, or of another porous sound absorbent configuration. (In order to improve strength characteristics, foamed plastic or similar materials is often disposed within the honeycomb configuration.) Problems have been encountered during the fabrication of mixers out of sandwich panel when it is desired to bend the panel into acute angles, particularly when the bend is to be of relatively small radius as compared to the thickness of the panel used.

Prior attempts to accomplish such bending have often resulted in undesired damage to the panel. One unsuccessful method has been to attempt to wrap the first or inner panel wall about a mold in the desired shape. This method has often led to tensile cracking of the second or outer wall during bending. Another method has been to apply bending force to the outer wall; but this has led to inner wall failure through buckling under the resulting compression. Other methods have led to the crushing of the core material, which reduces its strength and sound suppressing capabilities. The present invention solves the bending problem by effectively shortening the length of the first or inner panel wall in the area of the apex of the desired angle, while maintaining the second or outer wall at its smooth original length so that the natural tendency of the panel is to bend around the shortened first wall. This combination of operations facilitates the formation of the desired acute angle in the structural panel without the requirement to overly stress or strain either the outer or inner wall.

It is therefore an object of the present invention to provide sound suppressing turbofan mixers having improved structural integrity at points proximate acute angles formed therein.

It is a further object of this invention to provide a method for bending structural sandwich-type panels into acute angles having small bending radii, while maintaining the strength of such panels in proximity to the apex of such angles.

It is a more particular object of the present invention to facilitate the bending of sandwich-type structural panels by the low stress deformation of one panel wall into a preselected shape for the shortening of this wall relative to the second wall.

SUMMARY OF THE INVENTION

In order to accomplish the foregoing objects, as well as those which will become apparent during the detailed description which follows, the present invention provides for the deformation of the first of two substantially planar walls of a sandwich-type structural panel over an area proximate the apex of a desired angle, and for the contemporaneous or subsequent bending of the panel to form this angle. This deformation, in one embodiment of the present invention, forms the first panel wall into a shape having a plurality of repetitive waves in its cross section; but any low stress deformation of the first wall which results in its being shorter than the second wall will suffice. The deformation of the first panel wall may be accomplished by passing the panel between opposed rollers, one a toothed roller, for the application of transverse pressure to the panel thickness and the impression upon the first panel wall of the shape of the teeth of the toothed roller. However, any appropriate means may be utilized for the deforming of the inner wall. As a result of the application of this bending method to a preselected sandwich panel, a turbofan mixer of improved structure integrity may be formed. In the drawings:

FIG. 4 is a plan view of one form of bending apparatus according to the present invention operating upon a sandwich-type structural panel;

FIG. 5 shows a cylindrical toothed roller suitable for use in the embodiment of FIG. 4;

FIG. 6 shows a conical toothed roller suitable for alternative use in the embodiment of FIG. 4;

FIG. 7 is a perspective view of a portion of a sandwich-type structural panel after operation of the bending apparatus of the present invention and using the conical roller of FIG. 6;

FIG. 8 is a view similar to that of FIG. 7, but wherein the panel has been operated upon by the cylindrical roller of FIG. 5; and FIG. 9 is a perspective view of a second embodiment of bending apparatus according to the present invention operating upon a sandwich-type structural panel.

DESCRIPTION OF A PREFERRED EMBODIMENT

While the description of the bending method and apparatus of the present invention which follows is directed toward use in conjunction with mixers for turbofan engines, it will be appreciated by one skilled in the art that the method disclosed would serve equally well to perform the bending of similar materials put to other uses.

Figure 1:
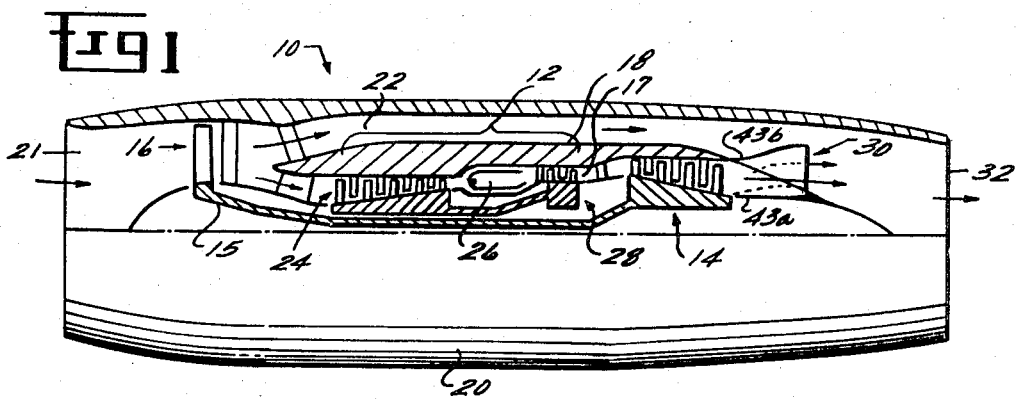
FIG. 1 is a partial section view of a typical turbofan engine incorporating a mixer according to the present invention.

The turbofan engine 10, seen in FIG. 1, includes a core engine 12 which generates a hot gas stream for driving fan turbine 14. The fan turbine 14 is connected to and drives rotor 15 of fan 16 disposed near the inlet of the engine and upstream of the exhaust 17 from the core engine. The core engine 12 and fan turbine 14 are disposed within a nacelle or inner casing 18. An elongated cowl or outer casing 20 defines an engine inlet 21 and, in combination with inner casing 8, defines an annular passage 22 surrounding and coaxial with core engine 12.

In operation, impingement of the fan turbine 14 by the hot gas stream from the core engine exhaust 17 drives fan 16. The fan 16 pressurizes an air stream entering inlet 21, the radially outward portion of which passes along annular passage 22, and the radially inner portion of which enters the core engine 12. In the core engine, the air stream is further compressed by a core engine compressor 24 to provide a highly pressurized air stream for supporting combustion of fuel in combustor 26. The hot gas stream exiting combustor 26 drives a core engine turbine 28 as well as the fan turbine 14. The fan stream and hot gas stream pass through a mixer 30 and are discharged from a single nozzle 32 to provide a single stream of thrust producing exiting fluid.

Figure 2:
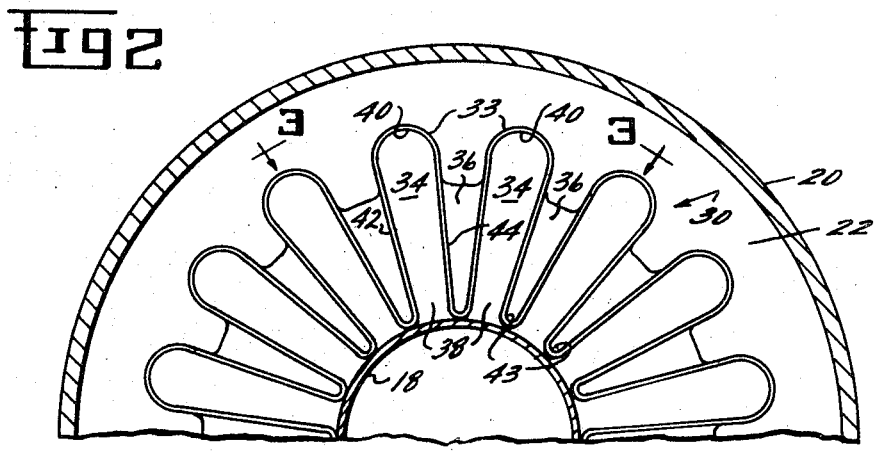
FIG. 2 depicts a partial end view of the mixer of the engine of FIG. 1.

The present invention is primarily concerned with the fabrication of mixer 30, and reference is made to the remaining figures for a more particular disclosure thereof. FIG. 2 depicts an end view of the mixer 30 housed within the outer casing 20 and cooperating with the inner casing 18. The mixer 30 includes a plurality of lobes 33 which project from the central circular area of the hot gas stream into the annular fan stream passage 22. The lobes form alternating chutes 34 and 36 through which portions of the hot gas stream and the fan stream respectively pass to be mixed downstream of the lobes 33.

Each hot gas stream chute 34 is defined by an inner wall 38, an outer wall 40, and side walls 42 and 44 of lobes 33. The upstream ends of adjacent walls 42 and 44 are joined at junction 43 in order to divide the hot gas stream flow as it exits the fan turbine 14 and to redirect it to enter the chutes 34 adjacent to fan stream chutes 36. This junction 43 (see FIGS. 1 and 3) is formed by bending the single structural panel, from which the two walls 42 and 44 are formed, into an acute angle of small bending radius (i.e., the radius of the bend at the apex of the angle) as will be described hereinafter.

The fan stream chutes 36 are defined by the outer housing 20, the inner housing 18 between the lobes 33, and by the outer wall 40 and the side walls 42 and 44 of lobes 33. The hot gas stream and fan stream portions, flowing through chutes 34 and 36 respectively, leave the downstream end of mixer 30 in the form of adjacent sectors to be mixed by turbulence during expulsion through the nozzle 32.

Experience with mixers of the present variety has taught that for maximum strength, the mixer should be formed of a single piece of structural material with lobes 33 and other curved mixer portions being formed by bending the material. Additionally, interest in minimizing the noise associated with turbofan engines has dictated that mixers be formed of porous or honeycomb-type material capable of absorbing sound generated by the core engine. Designs incorporating these concurrent considerations have led to the fabrication of mixers from a single sheet of sandwich-type structural panel. Such panel is commonly of the well-known variety having first and second substantially planar walls and a sound absorbent filler material sandwiched therebetween. This type of panel has proven very effective for the combined purposes for which it is used, but has presented problems of fabrication due to the inherent resistance of sandwich-type material to bending. Particular problems have arisen where, as at the junction 43 of the mixer, it is required to bend such material into acute angles having relatively small radii of bending at the apexes thereof. As was discussed hereinbefore, such bending has often resulted in structural failure of one form or another. Such failures are associated with the strain applied to one or both planar walls of the panel during bending, whereby the relative lengths of the two might be changed in order to form a bend.

The present invention solves the problem by means of providing for the shortening of the wall of the panel used to form the interior of the desired acute angle. Moreover, this shortening is accomplished without applying excessive stress or strain to either wall. Instead, the present invention provides for the deforming of a predetermined portion of the inner wall into a shape having a plurality of repetitive waves in the cross section thereof. The overall effect is to shorten the total length of the deformed wall relative to the still smooth second wall in order to make use of the natural tendency of the panel to bow or bend around the now-shortened deformed wall portion to facilitate the formation of the desired angle at that point.

FIG. 4 illustrates a first apparatus for accomplishing the bending according to the present invention. A structural panel 50 having first and second substantially planar walls 52 and 54 sandwiching filler material 56 is shown being fed into the bending apparatus of this first embodiment. A plurality of rollers 60 are spaced from an opposed toothed roller 62 which carries a number of teeth 64 of predetermined shape and size along its circumference. The number, size, and spacing of the teeth 64 are determined in accordance with the size and bending radius R of the angle desired to be formed.

The application of pressure transverse the panel 50 by rollers 60 and 62 serves to deform a predetermined portion of panel 50 into a form having a plurality of waves W having repetitive pitch, shape and size in the cross section. Thus, along the deformed portion of panel 50, wall 52 is shortened in total length with respect to wall 54, although the surface lengths of the two walls remain substantially the same. The effect of the shortening of wall 52 is to bow the panel in the direction shown in FIG. 4, and the bending of the panel further in this direction is thus facilitated. It will be apparent to one skilled in the art that the deformation of wall 52 in the manner shown by the application of pressure transverse its surface does not tend to strain the material of the wall as significantly as the stretching or crushing of the wall in the described bending methods of the prior art. Furthermore, it is evident that an irregular deformation of wall 52 having the effect of shortening this wall will suffice in place of the regularly spaced and shaped repetitive waves disclosed. Thus, the teeth of roller 62 need not be uniform in pitch, shape or size. But, for the sake of the even distribution of stress throughout the deformed portion of panel 50, repetitive waves are preferable.

Figure 3:
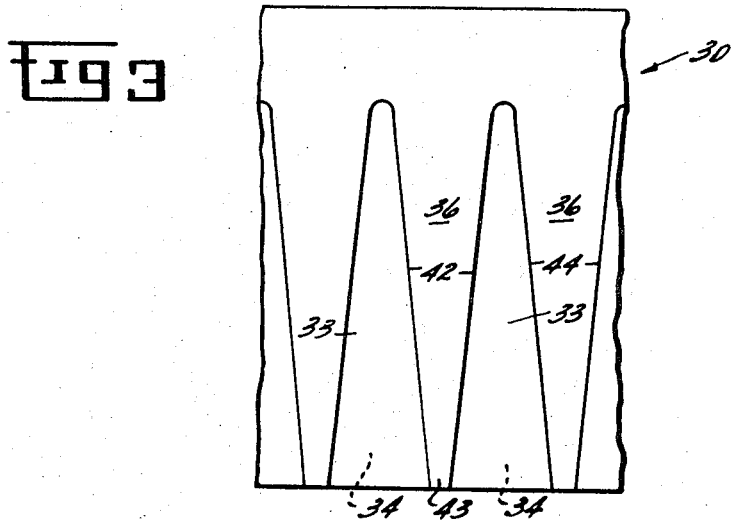
FIG. 3 is a section view of a portion of the engine of FIG. 1 looking radially inward along line 3—3 in FIG. 2.

In the fashion described, the junction 43 of walls 42 and 44 of FIG. 3 may be formed. Owing to the previously described operation of this junction (to divide the hot gas stream exiting the core engine and direct it through chutes 34) the apex of the angle of the junction between these two walls must be of relatively small radius R. This is required in order to efficiently divide the hot gas flow without losing excessive amounts of the kinetic energy thereof to stagnation. Application of this invention's bending technique to the panel forming walls 42 and 44 in FIG. 3 is evidenced by the waves W appearing upon the inner surface of junction 43 at the apex of the angle formed there.

For small bending radius angles exemplified by that between walls 42 and 44 in FIG. 3, the method of the present invention is particularly suited. However, it is to be noted that this process might be utilized in any bending of such a panel. Larger radius bends and thicker panel cross sections would permit the use of a toothed roller 62 in FIG. 4 having larger pitch between teeth 64 as well as greater tooth depth. Thus, the present invention is readily adaptable to uses involving different bending radii.

Another end achieved by the present invention is the provision for choise between uniform and non-uniform bending radii within a single structure. Depending upon the application of the panel, it may be desired to form an angle having an apex of uniform bending radius similar to that depicted in FIG. 8, or one of graduated bending radius similar to that shown in FIG. 7. For example, where it is desired to form a panel into an angle which gradually spreads in width, as $\theta_2$ expands to $\theta_1$ in FIG. 7, over a length $L_1$ of sandwich material, a graduated bending radius $R_2$ to $R_1$ would be appropriate.

On the other hand, when it is desired to form an angle of constant size, as $\theta_3$ equals $\theta_4$ in FIG. 8, over a length $L_2$ of material, a uniform bending radius, $R_3$ equaling $R_4$, is preferable. For example, the walls 42 and 44 of mixer 30 in FIGS. 1 and 3 are preferably aligned and outer points 43a and 43b of junction 43 (see FIG. 1). To this end, an angle having an apex with a uniform bending radius is suitable.

To illustrate means for allowing choice between uniform and non-uniform bending radii, FIGS. 5 and 6 depict alternative embodiments of the toothed rollers 62 of FIG. 4, suitable respectively for forming uniform and graduated bending radii. In FIG. 5, the roller 62' is cylindrical and is adapted to bend a predetermined portion of panel into a form wherein the repetitive waves making up the deformed portion of the panel are substantially parallel across the panel width and thus the angle formed will have a uniform radius of bending along the apex of the angle. This is illustrated in FIG. 8, wherein parallel lines 53 represent the waves created by the impression upon wall 52 of adjacent teeth of cylindrical roller 62'.

A conical or tapered toothed roller 62'' as shown in FIG. 6 will produce non-parallel wave impressions when applied to wall 52 of panel 50 owing to the teeth of the roller. In FIG. 7, non-parallel lines 53' represent the waves created by the impression of the teeth of conical toothed roller 62'' of FIG. 6. Thus, the angle formed in the panel will have an apex having a larger radius of bending at one end of the panel width than at the other.

An alternative embodiment of the present invention is depicted in FIG. 9 wherein the toothed roller is replaced by a reciprocable die 70, and the smooth opposed rollers 60 are replaced by a supporting or bearing wall 72. The apparatus in FIG. 9 is shown operating upon the same sandwich-type structural panel 50 having first wall 52, second wall 54, and filler 56.

In operation, a predetermined portion of wall 50 is gradually fed between supporting wall 72 and opposed die 70. Pressure is applied transverse the advancing panel 50, and reciprocable die 70 deforms wall 52 into a plurality of repetitive waves in the cross section. As in the embodiment described previously, the pitch between adjacent waves as well as wave depth are determined by the bending radius R to be achieved as well as by the thickness of panel 50. As was also described in connection with the first embodiment of the invention, the deformation of wall 52 by the impression thereupon of die 70 will create a tendency in panel 50 to bow and will facilitate the bending of the panel about the deformed portion thereof. In this manner, the fabrication of an angle in sandwich-type structural panels is achieved by the application of the present invention in this second embodiment.

As will be evident to one skilled in the art, the application of the principles of the present invention are not limited to use in fabricating mixers for turbofan engines. Nor are they limited to applications wherein sandwich-type structural panels are desired to be bent into acute angles having small radii of bending. Furthermore, while the means by which the bending is accomplished have been described with reference to two embodiments, one skilled in the art will be easily able to devise variations of these embodiments. For example, a plurality of dies might bear against and deform a panel simultaneously into the desired formation thereof. Other variations may be devised without departing from the spirit of the present invention.

What is claimed as new and desired to be secured by Letters Patent of the United States is:

1. In a turbofan engine of the type including a core engine for emitting a hot gas stream through an exhaust thereof, an annular passage surrounding the core engine, and a bladed fan disposed within said annular passage upstream of said exhaust for drawing a fan stream of air through said annular passage, a mixer disposed downstream of said exhaust for mixing said hot gas stream with said fan stream, said mixer comprising:

a plurality of lobes extending outward from the hot gas stream and into said annular passage, each of said lobes formed solely of a structural panel of the type including first and second spaced substantially planar walls and a filler material sandwiched therebetween, each lobe including an acute angle formed by bending said panel about said first wall, and said panel proximate the apex of said acute angle including a substantially smooth continuous curved portion of said second wall and a portion of said first wall deformed into a plurality of waves.

2. The mixer of claim 1 wherein said waves are of repetitive pitch, shape and size.

3. The mixer of claim 1 wherein a single structural panel forms a plurality of said lobes.

* * * * *